INVENTOR
Edmond Harvengt
BY L. Donald Myers
ATTORNEY

Feb. 11, 1958         E. HARVENGT         2,822,924

MEANS FOR DISCHARGING CONCENTRATES FROM CONCENTRATING PANS

Filed April 22, 1953         3 Sheets-Sheet 3

INVENTOR
*Edmond Harvengt*

BY *L. Donald Myers*
ATTORNEY

United States Patent Office 2,822,924
Patented Feb. 11, 1958

2,822,924
MEANS FOR DISCHARGING CONCENTRATES FROM CONCENTRATING PANS

Edmond Harvengt, Moustier sur Sambre, Belgium, assignor to Link-Belt Company, Chicago, Ill., a corporation of Illinois Application April 22, 1953, Serial No. 350,381

Claims priority, application Belgium May 19, 1952

6 Claims. (Cl. 209—496)

The invention has relation to concentrating pans and concerns the means used for discharging the concentrates obtained in such pans.

It is known that in concentrating pans the medium is required to be of some consistency to enable an efficient operation of the pans, and the discharge of the concentrates obtained in these pans raises the problem of the maintenance of the working medium in a state as regular as possible.

On the other hand, the nature or character of the treated materials and of said medium tends to cause considerable wear of the mechanical discharge devices used owing, amongst other, of the necessity to ensure the discharge of the materials with a minimum of accompanying liquid.

The invention aims to satisfy the above mentioned requirements and has for its object to provide discharge means for the concentrates of concentrating pans, so arranged as to enable not only the maintenance of the intended conditions of the working medium but also a regular discharge to be obtained and while avoiding any undue or excessive wear of the discharge means. To this end, in accordance with one feature of the invention, the concentrates evacuated from the pans are received in a tank partly filled with liquid and onto a continuously moving conveying member carrying them towards a location where they may be discharged and collected, means being provided for adjusting the consistency of the medium of the tank into which the pan concentrates are evacuated.

In accordance with another feature of the invention, for adjusting the consistency of the medium of the tank, provision is made for the introduction therein of a pressure fluid, preferably a liquid, said introduction being made adjustable.

According to yet another feature of the invention, the adjustment of the introduction of the pressure fluid may be ensured in an automatic manner, in interdependency with the changes or variations in consistency of the medium within the tank.

The invention includes the evacuating or discharge devices having the above mentioned features applied thereto, and in order that the invention may be well understood, certain preferred embodiments of evacuating or discharge devices are described hereafter in a more detailed manner and by way of example only, with reference to the accompanying drawings, wherein.

Figure 1:
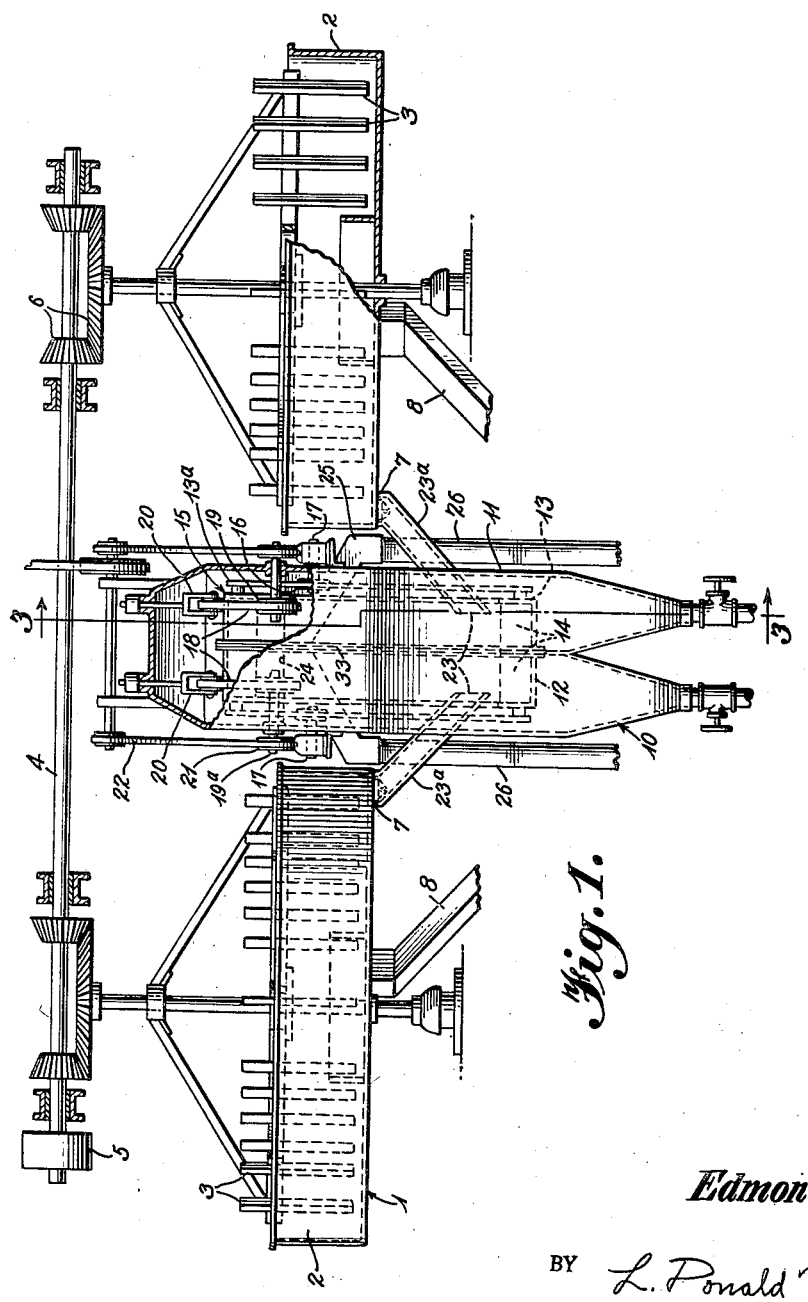
Figure 1 is an elevational view, showing generally a plant including concentrating pans and a discharge or evacuating device in accordance with the invention.
Figure 2:
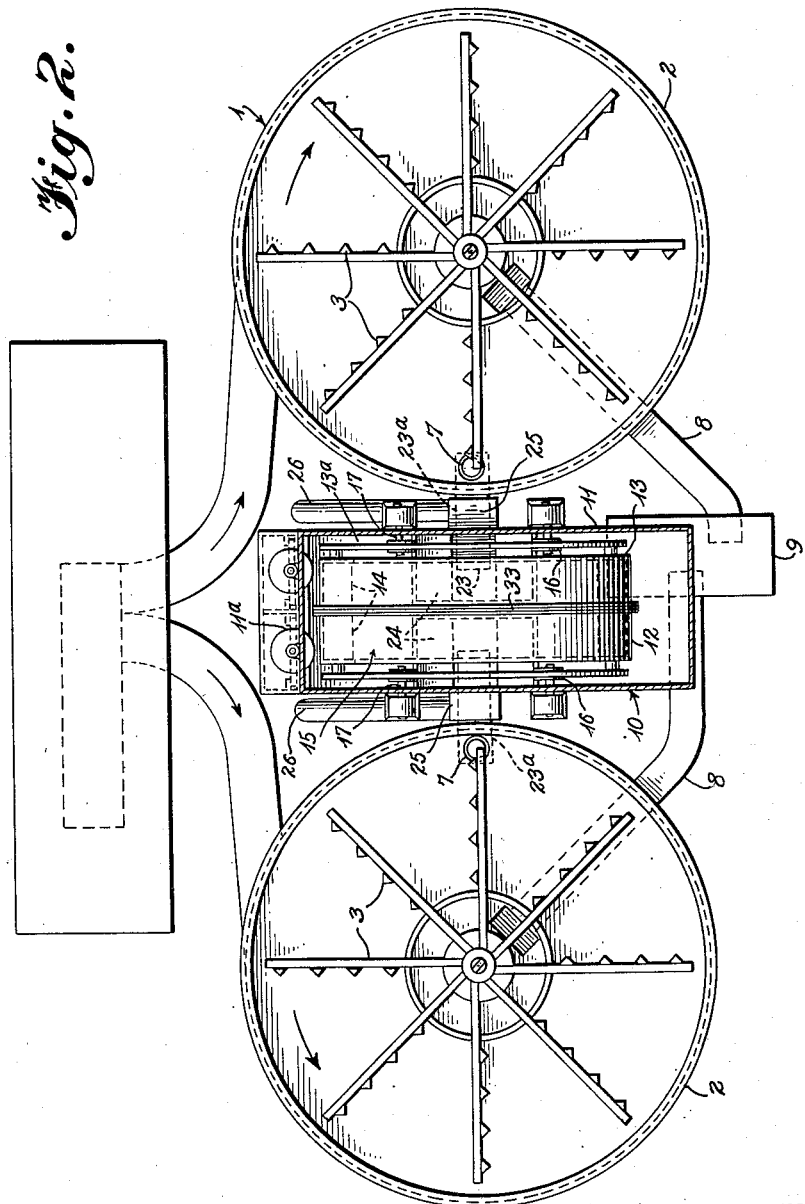
Figure 2 is a corresponding plan view with certain parts omitted.

Referring to the drawings, and first to Figs. 1 to 4, 1 designates concentrating pans of conventional construction including a fixed vessel 2 and rakes 3 carried around the vessel by a shaft 4 rotated by means of a pulley 5 and toothed wheels 6, each vessel having a peripheral outlet 7 for the concentrates and a central overflow outlet 8 for the tailings. The latter are collected at 9, see Fig. 2, and from there are led to a retreatment or settling location, not shown.

The concentrates discharged or evacuated at the peripheral outlet 7 of each vessel 2 are received in a discharge or evacuating device generally indicated 10.

In the example of Figs. 1 to 4, this discharge or evacuating device is formed with a shell 11 in which is mounted for rotation about its own axis, a ring member 12 having annular outside walls or flanges 13 between which extend perforated partitions 14, the whole forming a bucket type conveyor 15.

The rotating movement of the conveyor may be ensured in any suitable manner, and for example, as illustrated, by causing the inner edges of the walls or flanges 13, or that of associated annular rings 13a, to rest on rollers 16 arranged to freely rotate on pins 17 trunnioned in the shell 11, the driving being secured by means of an endless belt or band 18 passing over rollers 19 trunnioned in the shell 11 as well as over a portion of the outer circular face of the ring 12, a tensioning device of known type being provided at 20.

One of the rollers 19 is rotated through its shaft 19a by means of a suitable external driving mechanism such as the pulley 21 and the belt 22.

The admission of the materials from the pans, that is of the concentrates of these pans, is effected at 23, by means of the two conduits 23a and the said materials are deposited into the buckets of the conveyor 15 that are formed by the inner surface of the ring 12, the outside walls or flanges 13 and the perforated partitions 14, the rotating movement of the conveyor 15 carrying them towards the top of the path of travel of the buckets of the conveyor, where they are run into hoppers 24 and from the latter to the exterior through troughs 25 and discharge pipes 26.

Figure 3:
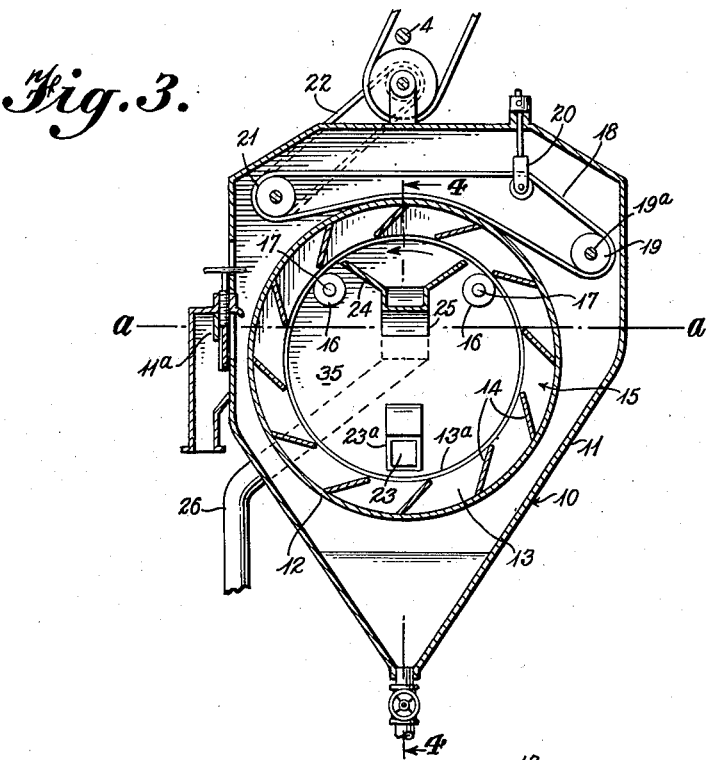
Figure 3 is a vertical sectional view taken on line 3—3 of Fig. 1.

In operation, liquid is poured into the tank 11 and adjusted by means of the gate valve, or the like, 11a, to secure equilibrium with the level of the liquid of the pans, the level then being approximately that indicated by the line a—a in Fig. 3 with the result that the materials may be discharged or evacuated from the pans substantially without carrying liquid away from these pans.

However, as the liquid of the said tank 11 becomes progressively laden with fine particles accompanying the concentrates discharged or evacuated from the pans, the consistency of the liquid may vary and become such that it impedes the discharge or evacuation from the pans and even interferes with the concentrating treatment carried out in the pans.

To avoid this disadvantage, means are provided to permit a predetermined degree of consistency of the medium in the tank 11 to be obtained or restored. In particular, there is provided for at least the tank 11, a liquid supply adjusted in accordance with the requirements and preferably in an automatic manner.

Such a supply may occupy various places; preferably however it is located in the lower portion of the tank or as in the example, in the conduits 23a conveying to the tank the materials discharged or evacuated from the pans.

The reference 27 designates an inlet nozzle connected to a supply main of water under pressure, not shown, and provided with an adjusting valve 28 the operating lever of which is connected, through an adjustable rod 29, to one arm of a lever 30 pivoted at 31. The other arm of the lever is attached to a loaded float 32 dipped into the liquid of the tank 11. The arrangement of this mechanism is such that when a change occurs in the consistency of this liquid in the tank the movement of the float 32 increases or reduces the opening of the valve 28 according to whether the consistency has been increased or reduced as compared to a given consistency, or to predetermined limits of consistency. In this way no interference will occur between the treatment carried out in the vessels of the pans and the discharge or evacuation of the concentrates thereof.

It is often desirable that the concentrated products obtained from different pans be collected separately, and the exemplified evacuating device is particularly well adapted to answer this requirement.

Figs. 1 to 4 show the association of an evacuating device with two concentrating pans, which pans, when required, may be operated in parallel.

Figure 4:
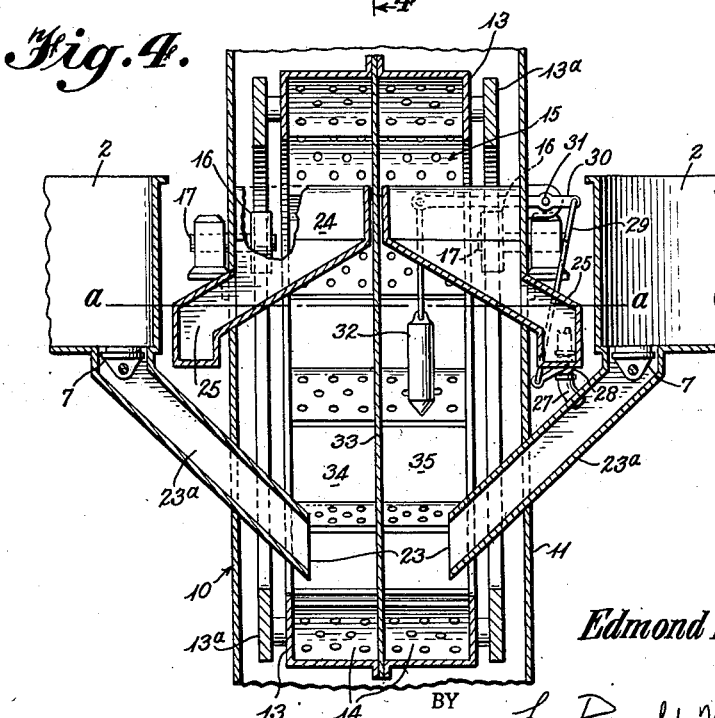
Figure 4 is a vertical sectional view along line 4—4 of Fig. 3.

In Fig. 4 it is seen that the flanged ring 12 is provided with a partition 33, which, preferably, extends over the entire cross sectional area of the ring but which also could be annular only. In either case, the partition provides for two compartments 34 and 35 in each of which the concentrates from one of the pans are separately received and from which they are similarly discharged or evacuated through the hopper 24, outlet 25 and pipe 26. In each of the compartments so formed the consistency of the liquid may be adjusted by means such as the elements 27 to 32, inclusive, already described.

As will be understood, more than one annular partition 33 could be provided, thus forming more than two compartments such as 34 and 35 of which the materials may be collected separately, the adjustment of the consistency of the liquid of the tank 11 being however common to all the compartments.

As will be understood, the invention is not limited to the constructional details described and illustrated but also includes the modifications and the alternatives thereof.

I claim:

1. An arrangement for discharging concentrates from concentrating pans, comprising an external tank, a liquid body filling said tank up to a predetermined level therein, conveyor means in the tank, said conveyor means including a ring with side walls supported for rotation in the tank and dipping in part into the liquid body, driving means for said conveyor means, conduit means connected to the concentrate outlet of the pan and opening into the tank below said predetermined level and over the inner surface of the ring and between said side walls, a collecting hopper, an inlet for the hopper above the upper level of the liquid body for receiving the materials discharged from the conveyor means, and conduit means for leading to the outside of the tank the materials collected in the hopper, means for measuring the consistency of the liquid of said body, means for supplying pressure fluid to the tank, and an operative connection between the said measuring means and fluid pressure supplying means for varying the amount of fluid supplied to the tank in response to variations in the consistency of the liquid determined by said measuring means.

2. An arrangement as in claim 1, comprising apertured partitions arranged in spaced relation on the inner surface of the ring and between the flanges thereon to form a plurality of buckets.

3. An arrangement as in claim 1, comprising idle rollers for supporting the flanged ring, driving means and a driving connection between said driving means and the outer periphery of the flanged ring.

4. An arrangement as in claim 1, comprising a partition arranged within the inner space between the walls of the ring, thereby forming separate compartments therein, conduit means connected to the concentrate outlets of pans and opening in the lower portion of each said separate compartments, a collecting hopper in the upper portion of each said separate compartments and conduit means for leading to the outside of the tank the materials collected in each said hoppers.

5. An arrangement as in claim 1, comprising an adjustable inlet valve for pressure fluid in the conduit means connecting the concentrate outlet of a pan to the tank, a loaded float in the tank and an operative connection between said float and said valve.

6. An arrangement for discharging concentrates from concentrating pans, comprising an external tank, a liquid body filling said tank, a ring with side walls supported for rotation in the tank and dipping in part into the liquid body, driving means for said ring, a partition arranged within the space between the side walls of the ring thereby forming two separated compartments therein, conduit means connected to the concentrate outlets of pans and opening in the lower portion of each said compartments, a collecting hopper in the upper portion of each compartment and conduit means for leading to the outside of the tank the materials collected in each hopper, an adjustable inlet valve for pressure fluid in the conduit means connecting the concentrate outlet of a pan to each said compartments, a loaded float in each compartment and an operative connection between said loaded float and the respective adjustable inlet valve.

References Cited in the file of this patent

UNITED STATES PATENTS

| 1,143,202 | Keene | June 15, 1915 |
| 1,619,807 | Blomfield | Mar. 8, 1927 |
| 1,839,804 | Perkins | Jan. 5, 1932 |
| 2,474,774 | Bean | June 28, 1949 |

FOREIGN PATENTS

| 24,199 | Great Britain | Nov. 8, 1904 |
| 326,294 | France | Feb. 17, 1903 |